Figure 1:
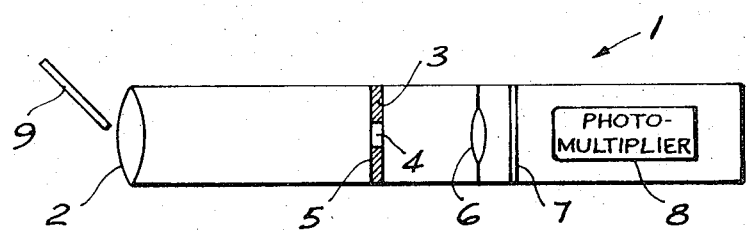

United States Patent [19]
Skagerlund

[11] 3,827,806
[45] Aug. 6, 1974

[54] DEVICE FOR FACILITATING THE ADJUSTMENT OF AN OPTICAL SYSTEM

[75] Inventor: Lars-Erik Skagerlund, Karlskoga, Sweden

[73] Assignee: Aktiebolaget Bofors, Bofors, Sweden

[22] Filed: Oct. 26, 1971

[21] Appl. No.: 192,150

Related U.S. Application Data
[63] Continuation of Ser. No. 814,928, April 10, 1969, abandoned.

[30] Foreign Application Priority Data
Apr. 18, 1968 Sweden.............................. 5205/68

[52] U.S. Cl.................. 356/138, 356/152, 356/153, 356/4
[51] Int. Cl. .......................................... G01b 11/26
[58] Field of Search ....... 356/138, 153, 152, 4, 121; 350/202; 33/1 CC

[56] References Cited
UNITED STATES PATENTS
2,748,658 6/1956 Bouwers ........................ 350/202 X
3,049,054 8/1962 Waland ........................... 350/206 X
3,242,795 3/1966 Hughes ........................... 356/138 X
3,343,449 9/1967 Blackwell et al. .............. 350/206 X
3,464,770 9/1969 Schmidt .............................. 356/4
3,518,005 6/1970 Weber ........................... 356/172 X
3,531,205 9/1970 Nussmeier ..................... 356/153 X
3,533,696 10/1970 DeWinter .............................. 356/4
3,554,653 1/1971 Zielke et al. ...................... 356/153
3,734,592 5/1973 Sztankay et al. ................... 350/17

FOREIGN PATENTS OR APPLICATIONS
1,210,360 2/1966 Germany
1,258,766 1/1968 Germany

*Primary Examiner*—Ronald L. Wibert
*Assistant Examiner*—Paul K. Godwin
*Attorney, Agent, or Firm*—Hane, Baxley & Spiecens

[57] ABSTRACT

An optical system for the receiver section of a laser range finder comprising an objective, a diaphragm with a very small aperture, an ocular and a photomultiplier immediately behind the ocular. The diaphragm is at right angles to the optical axis of the surface and is provided with a reflective coating on that surface which faces the objective.

3 Claims, 2 Drawing Figures

PATENTED AUG 6 1974   3,827,806

INVENTOR.
LARS-ERIK SKAGERLUND
BY Hane and Bafley
ATTORNEYS

DEVICE FOR FACILITATING THE ADJUSTMENT OF AN OPTICAL SYSTEM

This is a continuation of application Ser. No. 814,928, filed Apr. 10, 1969, now abandoned.

BACKGROUND OF THE INVENTION

The invention relates to a device for facilitating the adjustment of an optical system and particularly the optical system of a receiver in a range finder system comprising a laser.

In a range finder of this type the optical systems for the transmission and the reception are mounted adjacent to each other, and the optical axes of the two systems should be practically parallel to each other in order that both systems shall be pointed at the object to which the distance is to be measured. Since the optical system of the receiver has a very small field of view, the position of the system in relation to the transmission system must be adjusted with great accuracy. Such an adjustment is of course effected when the equipment is manufactured, but the setting may be changed during operation so that a new adjustment must be made.

When making such an adjustment the optical system of the transmitter is first pointed at a certain object or a target board provided for this purpose, and then the optical system is retained in this position while the optical system of the receiver is pointed at the same target.

The optical system of the receiver comprises an objective, a diaphragm having a very small aperture and an ocular behind which a photo-multiplier is arranged so that the entering radiation is directed towards the photo-sensitive layer of the photomultiplier. It may seem obvious to use this optical system as a telescope when making the adjustment. However, in practice this meets with certain difficulties. In order that it shall be possible to look through the ocular of the system, the photomultiplier provided behind the ocular must be removed. This can of course be done, but the field of view obtained is extremely limited which may entail a lengthy and tedious searching before the image of the target is made to appear in the field of view.

In order to facilitate the use of the optical system of the receiver as a telescope for the adjustment procedure it has previously been proposed to make the diaphragm in the form of a mirror which is disposed with the reflecting surface at an angle of 45° to the optical axis of the system, and abreast of this mirror an ocular is provided in an opening in the cover of the system. This ocular and the reflecting surface of the diaphragm and the objective of the system form together a telescope having a relatively large field of view. This device, however, leads to a complication and an increase in the costs for the equipment.

OBJECT AND SUMMARY OF THE INVENTION

It is an object of the present invention to provide a simpler device, which makes it possible to utilize the optical system as a telescope for the adjustment procedure. According to the invention the diaphragm is provided with a reflecting surface located in a plane at right angles to the optical axis of the system and facing the objective so that light entering through the objective is in part reflected back towards the objective. During the adjustment procedure a mirror is placed in front of a part of the objective and held at such angle that part of the light reflected by the reflecting surfaces of the diaphragm and passed back through the objective is reflected by the mirror towards the eye. It is then possible to observe in the mirror an image of the target at which the range finder is pointed. The field of view of the receiver which is determined by the aperture in the diaphragm, then appears as a dark point in the image. The light from the target area enters that part of the objective which is not covered by the mirror, and an image is projected into the plane of the reflecting surface on the diaphragm. The light is relfected by this reflecting surface and travels back through the objective, so that part of it is reflected by the outer mirror. The fact that a part (e.g., one half) of the objective is covered by the outer mirror does not result in any part of the image being cut off but only in the image becoming somewhat less luminous.

The outer mirror can be an ordinary pocket mirror which is held in front of the objective. However, it is more convenient to provide a holding device adjacent to the objective for holding the mirror. The use of the mirror is facilitated if it is slightly convex so that the operator's eye need not be adapted to infinite distance which would cause irritation due to the presence of nearby objects within the field of view.

The image obtained in this manner is not magnified which makes the adjustment difficult. However, a laser range finder is always provided with some sort of directional telescope having a considerable magnification which can be utilized for the adjustment of the optical system of the laser receiver by causing the light reflected from the outer mirror to enter the objective of the directional telescope by means of an additional mirror. Hereby a magnified image of the field of view of the laser receiver can be observed through the directional telescope. The outer mirror may consist of separate plane mirrors or of reflecting surfaces of a suitably designed prism.

DRAWING AND DETAILED DESCRIPTION

In the accompanying drawing

Figure 2:
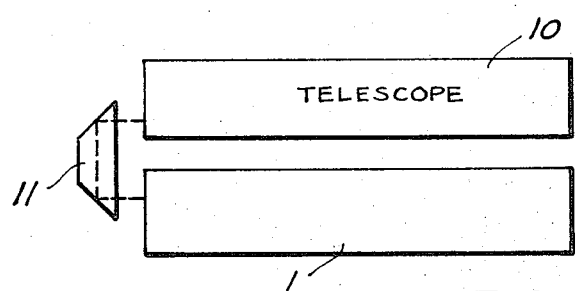

FIG. 1 shows schematically and in section an optical system including a device according to the invention, and FIG. 2 shows a device for utilizing an existing directional telescope for the adjustment.

The optical system in FIG. 1 is enclosed in a cover 1 and comprises an objective 2, a diaphragm 3 with an aperture 4, an ocular 6 and a filter 7. The filter removes from the entering light such components which have a wave length different from that of the laser light. A photo-multiplier 8 is located behind the filter 7. The aperture 4 in the diaphragm 3 has a very small diameter, for instance 0.1 mm.

According to the invention the surface 5 of the diaphragm 3, which faces the objective 2, is made reflective. The figure also shows an outer mirror 9 which is arranged at an angle of 45° to the optical axis of the system and so located that it covers about one half of the objective 2.

In FIG. 2 a directional telescope 10 is arranged beside the optical system of the laser receiver. Instead of a mirror (9 in FIG. 1) a prism 11 is provided here so that the light passing out through the objective 2 (FIG. 1) is reflected by two surfaces of the prism and is thereby caused to enter the objective of the directional telescope. Hereby an enlarged image of the field of use of the laser receiver can be observed through the directional telescope. The prism 11 can of course be replaced by two mirrors. The prism or the mirrors are preferably removably disposed in a holder.

The device according to the invention affords several advantages over prior devices for the same purpose. Except for the reflective coating on the diaphragm no additional components are required in the optical system of the receiver. The adjustment can be checked without removing any parts from the equipment. When a single mirror (9 in FIG. 1) is used the image is not reversed. To facilitate the adjustment still further, the diaphragm can be provided with a reticle.

I claim:

1. An optical system for receiving and detecting light emitted from a target area, comprising an objective, a diaphragm located behind said objective and having a small aperture, and a photo-sensitive means behind said diaphragm, and positioned to receive light passing through said small aperture, said diaphragm having a reflective surface positioned in a plane at right angles to the optical axis of the system and facing said objective to cause a portion of the light entering through said objective to be reflected towards and out of said objective, and reflective means outside said objective for reflecting light passing out of said objective, thereby enabling an observer to view simultaneously an image of said target area and an image of said aperture.

2. An optical system comprising a first telescope combined with photo-sensitive means for receiving light emitted from a target area, said first telescope including an objective and a diaphragm, said diaphragm being located between said objective and said photo-sensitive means, said diaphragm having a relatively small aperture and a reflective surface positioned in a plane at right angles to the optical axis of said first telescope to cause part of the light entering through said objective to be reflected towards and out from said objective, said system further comprising a second telescope and reflecting means for guiding part of the light thus reflected by said diaphragm in said first telescope from the objective of the first telescope into said second telescope thereby enabling an observer to view by means of said second telescope simultaneously an enlarged image of said target area and said aperture.

3. The optical system of claim 2 wherein said reflective means comprises a prism.

* * * * *